(12) United States Patent
Kim et al.

(10) Patent No.: US 11,272,343 B2
(45) Date of Patent: Mar. 8, 2022

(54) DISPLAY APPARATUS AND METHOD OF CONTROLLING THE SAME

(71) Applicant: SAMSUNG ELECTRONICS CO., LTD., Suwon-si (KR)

(72) Inventors: Doyoung Kim, Suwon-si (KR); Woosub Choi, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/004,763

(22) Filed: Aug. 27, 2020

(65) Prior Publication Data

US 2021/0067937 A1 Mar. 4, 2021

(30) Foreign Application Priority Data

Aug. 27, 2019 (KR) .................. 10-2019-0104937

(51) Int. Cl.
*H04W 4/80* (2018.01)
*H01Q 1/24* (2006.01)
(Continued)

(52) U.S. Cl.
CPC .......... *H04W 4/80* (2018.02); *G02F 1/13454* (2013.01); *G02F 1/133602* (2013.01);
(Continued)

(58) Field of Classification Search
CPC .......... G02F 1/133602; G02F 1/13454; H01Q 1/243; H04B 5/0056; H04M 1/0266;
(Continued)

(56) References Cited

U.S. PATENT DOCUMENTS 9,178,572 B1\* 11/2015 Zhang .................. H04B 5/0012
10,686,246 B2\* 6/2020 Park ........................ H01Q 1/22
(Continued)

FOREIGN PATENT DOCUMENTS

JP 2007-257483 A 10/2007
JP 2010-102531 A 5/2010
(Continued)

OTHER PUBLICATIONS

International Search Report (PCT/ISA/210) dated Dec. 21, 2020 by the International Searching Authority in counterpart International Patent Application No. PCT/KR2020/011434.

*Primary Examiner* — David Bilodeau
(74) *Attorney, Agent, or Firm* — Sughrue Mion, PLLC

(57) ABSTRACT

A display apparatus and a controlling method capable of enabling Near Field Communication (NFC) between the display apparatus and an external electronic device by embedding an NFC antenna inside the display apparatus are provided. The display apparatus includes a liquid crystal panel comprising a plurality of pixels; a backlight unit disposed behind the liquid crystal panel and configured to supply light to the liquid crystal panel; a liquid crystal panel driver configured to apply a voltage to the liquid crystal panel; a Near Field Communication (NFC) antenna disposed behind the backlight unit; and a controller configured to, based on an NFC mode being selected, control the liquid crystal panel driver such that at least one pixel in a region corresponding to a position of the NFC antenna among the plurality of pixels displays a white object.

18 Claims, 14 Drawing Sheets

(51) Int. Cl.
*H04M 1/02* (2006.01)
*G02F 1/13357* (2006.01)
*G02F 1/1345* (2006.01)

(52) U.S. Cl.
CPC .......... *H01Q 1/243* (2013.01); *H04M 1/0266* (2013.01); *H04M 2201/38* (2013.01); *H04M 2250/04* (2013.01)

(58) Field of Classification Search
CPC ......... H04M 1/72412; H04M 2201/38; H04M 2250/04; H04W 4/80
See application file for complete search history.

(56) References Cited

U.S. PATENT DOCUMENTS

| | | | | |
|---|---|---|---|---|
| 2008/0093447 | A1* | 4/2008 | Johnson | G06K 9/2063 235/383 |
| 2009/0067846 | A1* | 3/2009 | Yu | H04M 1/72412 398/128 |
| 2009/0295708 | A1* | 12/2009 | Yamashita | G09G 3/342 345/102 |
| 2013/0281014 | A1* | 10/2013 | Frankland | H04W 4/80 455/41.1 |
| 2016/0226128 | A1* | 8/2016 | Uraki | H01Q 1/243 |
| 2017/0214434 | A1* | 7/2017 | Hong | H04W 12/06 |
| 2017/0278175 | A1* | 9/2017 | Park | G06Q 30/0603 |
| 2018/0075817 | A1* | 3/2018 | Kim | G09G 3/3688 |
| 2019/0067333 | A1* | 2/2019 | Yamamoto | G06F 3/04164 |
| 2019/0102026 | A1* | 4/2019 | Abe | G06F 3/0412 |
| 2020/0119438 | A1* | 4/2020 | Maruyama | H01Q 1/36 |

FOREIGN PATENT DOCUMENTS

| | | |
|---|---|---|
| JP | 2016-143971 A | 8/2016 |
| KR | 10-2015-0005980 A | 1/2015 |
| KR | 1020170020148 A | 2/2017 |
| KR | 1020180079422 A | 7/2018 |
| WO | 00/057344 A1 | 9/2000 |

* cited by examiner

CLOSE

DISPLAY APPARATUS AND METHOD OF CONTROLLING THE SAME

CROSS-REFERENCE TO RELATED APPLICATION(S)

This application is based on and claims priority under 35 U.S.C. § 119 to Korean Patent Application No. 10-2019-0104937, filed on Aug. 27, 2019 in the Korean Intellectual Property Office, the disclosure of which is incorporated by reference herein in its entirety.

BACKGROUND

1. Field

The disclosure relates to a display apparatus capable of performing Near Field Communication (NFC), and a method of controlling the same.

2. Description of Related Art

Existing display apparatuses have been generally provided for watching TV programs at home, but recently, display apparatuses are being installed in public or commercial spaces to provide specific information, for example, advertisements. These display apparatuses are referred to as signage.

In particular, digital signage is equipped with a wireless communication module, so that a central server can control content displayed on the digital signage, and may receive necessary information from an external server or exchange information with other electronic devices.

For example, it is possible to transmit and receive specific information by performing wireless communication with a mobile device carried by a visitor in the public or the commercial spaces.

SUMMARY

An aspect of the disclosure is to provide a display apparatus capable of enabling Near Field Communication (NFC) between the display apparatus and an external electronic device by embedding an NFC antenna inside the display apparatus, and a method of controlling the same.

Another aspect of the disclosure is to provide a display apparatus capable of improving the sensitivity of NFC communication between the NFC antenna and the external electronic device by opening a pixel corresponding to a position of the NFC antenna in response to operating in an NFC mode, and a method of controlling the same.

Another aspect of the disclosure is to provide a display apparatus capable of enabling a user to grasp a tag position by displaying a white object on the pixel corresponding to the position of the NFC antenna when operating in the NFC mode, and a method of controlling the same.

Additional aspects, features and advantages of the disclosure will be set forth in part in the description which follows and, in part, will be obvious from the description, or may be learned by practice of the disclosure.

According to an embodiment, there is provided a display apparatus including: a liquid crystal panel comprising a plurality of pixels; a backlight unit disposed behind the liquid crystal panel and configured to supply light to the liquid crystal panel; a liquid crystal panel driver configured to apply a voltage to the liquid crystal panel; a Near Field Communication (NFC) antenna disposed behind the backlight unit; and a controller configured to, based on an NFC mode being selected, control the liquid crystal panel driver such that at least one pixel in a region corresponding to a position of the NFC antenna among the plurality of pixels displays a white object.

The backlight unit includes a light guide plate and at least one light source disposed on at least one side of the light guide plate.

Based on the NFC mode being selected, the controller is further configured to control the liquid crystal panel driver to open the at least one pixel in the region corresponding to the position of the NFC antenna among the plurality of pixels.

Based on the NFC mode being selected, the controller is further configured to control the liquid crystal panel driver so as to not apply the voltage to the at least one pixel in the region corresponding to the position of the NFC antenna among the plurality of pixels.

Based on the NFC mode being selected, the controller is further configured to control the liquid crystal panel driver so as to not apply the voltage to a plurality of subpixels included in at least one pixel of the region corresponding to the position of the NFC antenna among the plurality of pixels.

Based on the NFC mode being selected, the controller is further configured to control the liquid crystal panel driver to apply the voltage that is less than or equal to a reference voltage value to the at least one pixel in the region corresponding to the position of the NFC antenna among the plurality of pixels.

Based on the NFC mode being selected, the controller is further configured to control the liquid crystal panel driver so that the at least one pixel of the region corresponding to the position of the NFC antenna, among the plurality of pixels, passes an amount of light, supplied from the backlight unit, that is greater than or equal to a reference light value.

The display apparatus further includes a rear structure disposed rear to the backlight unit and mounted with the NFC antenna.

The rear structure includes a bottom chassis.

The display apparatus further includes an inputter configured to receive an input selecting the NFC mode.

Based on an external device performing an NFC function being tagged on the white object displayed on the at least one pixel, the NFC antenna is configured to receive a signal transmitted from the external device.

According to an embodiment, there is provided a method of controlling a display apparatus, the display apparatus including a liquid crystal panel comprising a plurality of pixels, a backlight unit disposed behind the liquid crystal panel and configured to supply light to the liquid crystal panel, and a liquid crystal panel driver configured to apply a voltage to the liquid crystal panel, the method includes: receiving, by an inputter, an input for selecting a Near Field Communication (NFC) mode; and based on receiving the input for selecting the NFC mode, controlling, by a controller, the liquid crystal panel driver such that at least one pixel in a region corresponding to a position of an NFC antenna among the plurality of pixels displays a white object.

The backlight unit includes a light guide plate and at least one light source disposed on at least one side of the light guide plate.

The controlling of the liquid crystal panel driver further includes, based on the NFC mode being selected, controlling the liquid crystal panel driver to open the at least one pixel in the region corresponding to the position of the NFC antenna among the plurality of pixels.

The controlling of the liquid crystal panel driver further includes, based on the NFC mode being selected, controlling the liquid crystal panel driver so as to not apply the voltage to the at least one pixel in the region corresponding to the position of the NFC antenna among the plurality of pixels.

The controlling of the liquid crystal panel driver further includes, based on the NFC mode being selected, controlling the liquid crystal panel driver so as to not apply the voltage to a plurality of subpixels included in the at least one pixel of the region corresponding to the position of the NFC antenna among the plurality of pixels.

The controlling of the liquid crystal panel driver further includes, based on the NFC mode being selected, controlling the liquid crystal panel driver to apply the voltage that is less than or equal to a reference voltage value to the at least one pixel in the region corresponding to the position of the NFC antenna among the plurality of pixels.

The controlling of the liquid crystal panel driver further includes, based on the NFC mode being selected, controlling the liquid crystal panel driver so that the at least one pixel of the region corresponding to the position of the NFC antenna among the plurality of pixels passes an amount of light, supplied from the backlight unit, that is greater than or equal to a reference light value.

The display apparatus further includes a rear structure disposed rear to the backlight unit and mounted with the NFC antenna.

The method further includes, based on an external device performing an NFC function being tagged on the white object displayed on the at least one pixel, receiving, by the NFC antenna, a signal transmitted from the external device.

BRIEF DESCRIPTION OF THE DRAWINGS

These and/or other aspects, features and advantages of the disclosure will become apparent and more readily appreciated from the following description of the embodiments, taken in conjunction with the accompanying drawings of which.

DETAILED DESCRIPTION

Figure 1:
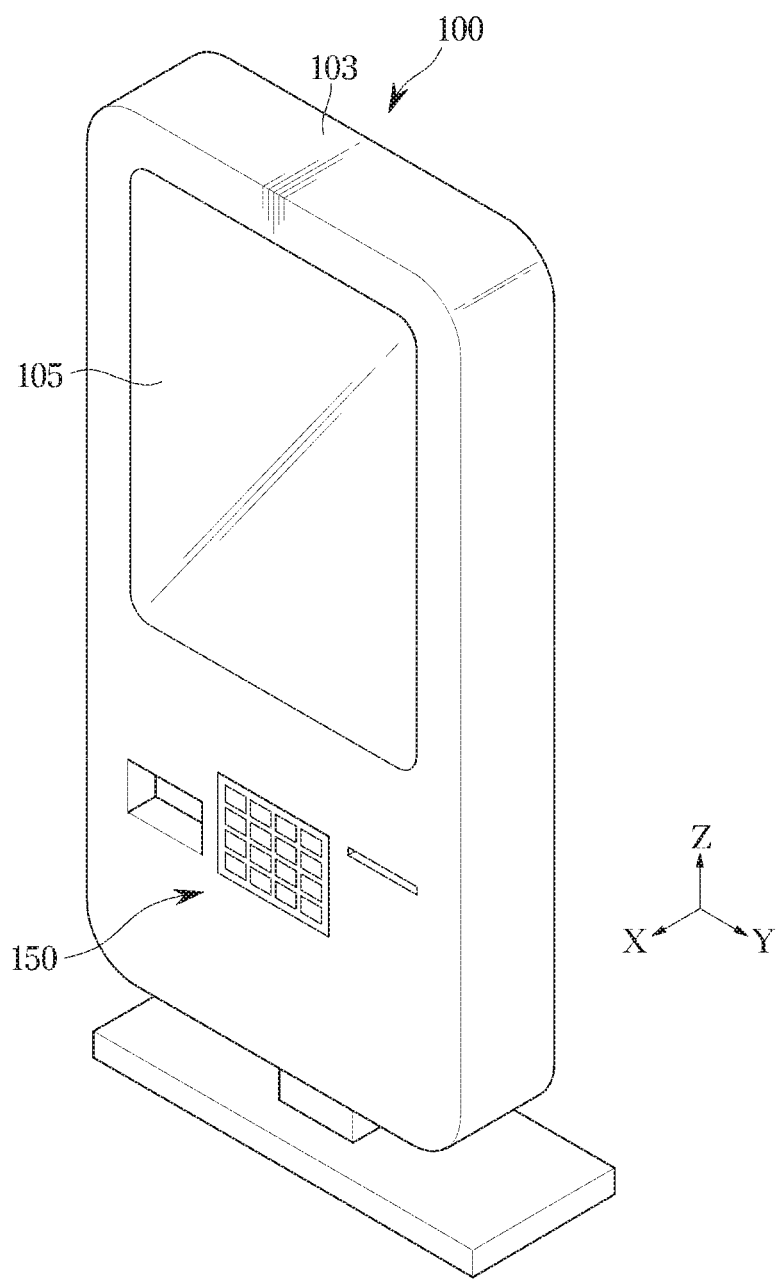
FIG. 1 is a perspective view illustrating an appearance of a display apparatus according to an embodiment.

Like reference numerals refer to like elements throughout the disclosure. Not all elements of embodiments of the disclosure will be described, and description of what are commonly known in the art or what overlap each other in the embodiments will be omitted. The terms as used throughout the disclosure, such as "~part," "~module," "~member," "~block," etc., may be implemented as software and/or hardware, and a plurality of "~parts," "~modules," "~members," or "~blocks" may be implemented in a single element, or a single "~part," "~module," "~member," or "~block" may include a plurality of elements.

It will be understood that when an element is referred to as being "connected" to another element, it can be directly or indirectly connected to the other element, wherein the indirect connection includes "connection" via a wireless communication network.

Also, when a part "includes" or "comprises" an element, unless specifically indicated otherwise, the part may further include other elements, not excluding the other elements.

Further, when it is stated that a layer is "on" another layer or substrate, the layer may be directly on another layer or substrate or a third layer may be disposed therebetween.

It will be understood that, although the terms first, second, third, etc., may be used herein to describe various elements, the elements should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. Each of the steps may be implemented in an order different from the illustrated order unless the context clearly indicates otherwise.

Hereinafter, the operation principles and embodiments of the disclosure will be described with reference to the accompanying drawings.

Hereinafter, embodiments of a display apparatus and a method of controlling the same will be described in detail with reference to the accompanying drawings.

Figure 2:
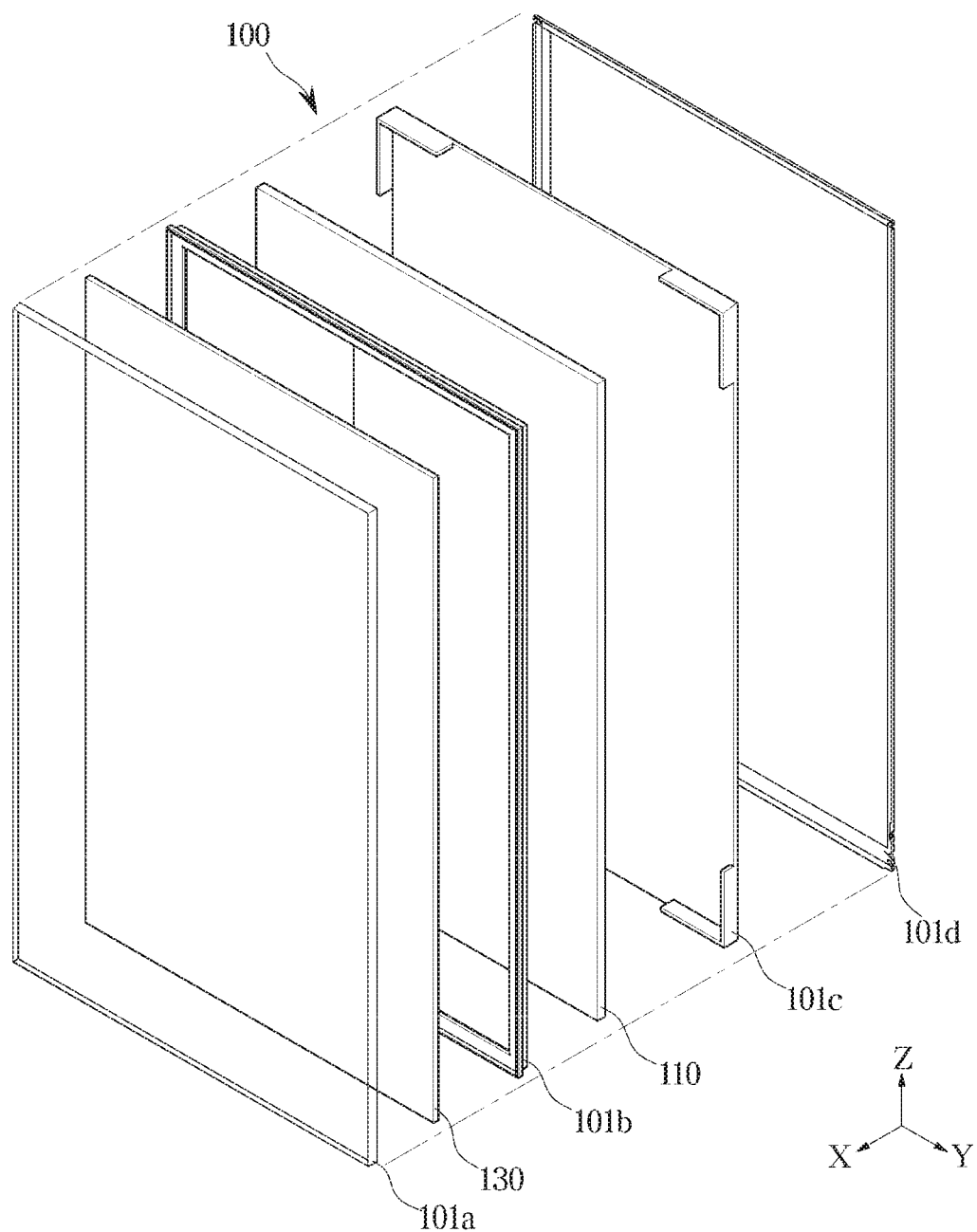
FIG. 2 is an exploded perspective view illustrating a part of a display apparatus according to an embodiment.

FIG. 1 is a perspective view illustrating an appearance of a display apparatus according to an embodiment, and FIG. 2 is an exploded perspective view illustrating a part of a display apparatus according to an embodiment.

A display apparatus according to an embodiment may be a display apparatus used for watching TV programs at home or a display apparatus for various purposes such as an electronic blackboard. In the following embodiments, digital signage is used as an example of a display apparatus and will use this example to describe the embodiments.

Referring to FIG. 1, a display apparatus 100 according to an embodiment may be installed in public places such as subway stations, airports, terminals, parks, bus stops, and sidewalks, or commercial spaces such as restaurants, hospitals, and movie theaters.

A screen 105 on which an image output by the display apparatus 100 is displayed may be provided in one area of a main body 103 that accommodates components of the display apparatus 100, and an inputter 150 for receiving a user input may be provided in another area. The screen 105 may refer to an area on the main body 103 in which the image is displayed, and components related to generating the image may be included in the display apparatus 100.

The inputter 150 may be implemented according to various known input methods such as a button, a jog shuttle, and a touch pad. In addition, the touch pad may be disposed on a front surface of the screen 105 to implement a touch screen.

The display apparatus 100 may be implemented as a stand type as illustrated in FIG. 1, or mounted on a wall and implemented as a wall-mounted type. In addition, as illustrated in FIG. 1, the display apparatus 100 may be implemented in a rectangular shape in which the width (length in a Y-axis direction) is shorter than the height (length in a Z-axis direction). Also, the display apparatus 100 may be implemented in a rectangular shape in which the width is longer than the height or in a square shape. There is no limitation on the manner in which the display apparatus 100 is supported or the shape of the display apparatus 100.

In an embodiment, the image may be output in a forward direction (+X direction). An opposite direction (−X direction) may be referred to as backward direction. In addition, a coordinate system of an XYZ axis may be based on the display apparatus 100, and it is assumed that the coordinate system of the display apparatus 100 does not change even when the display apparatus 100 is oriented differently from that of FIG. 1.

In addition, the display apparatus 100 may be implemented as a liquid crystal display (LCD) apparatus. Referring to FIG. 2, a liquid crystal panel 130 that blocks or transmits light emitted from a backlight unit 110 that emits surface light forward may be provided inside the main body 103.

In addition, the main body 103 may include a bezel 101a, a frame middle mold 101b, a bottom chassis 101c, and a rear cover 101d for supporting and fixing the liquid crystal panel 130, and the backlight unit 110.

The backlight unit 110 may include a point light source for emitting monochromatic light or white light, and may refract, reflect, and scatter the light to convert the light emitted from the point light source into a uniform surface light.

The backlight unit 110 may include a plurality of the point light sources for emitting monochromatic light such as blue light or white light, and may refract, reflect, and scatter the light to convert the light emitted from the point light sources into a uniform surface light.

The liquid crystal panel 130 may be provided in front of the backlight unit 110 and may generate the image by blocking or transmitting the light emitted from the backlight unit 110.

The liquid crystal panel 130 may be formed of a plurality of pixels arranged in a two-dimensional (2D) matrix form. The plurality of pixels included in the liquid crystal panel 130 may independently block or transmit the light from the backlight unit 110, and the image may be displayed on the screen 105 by the light emitted from the plurality of pixels.

Figure 3:
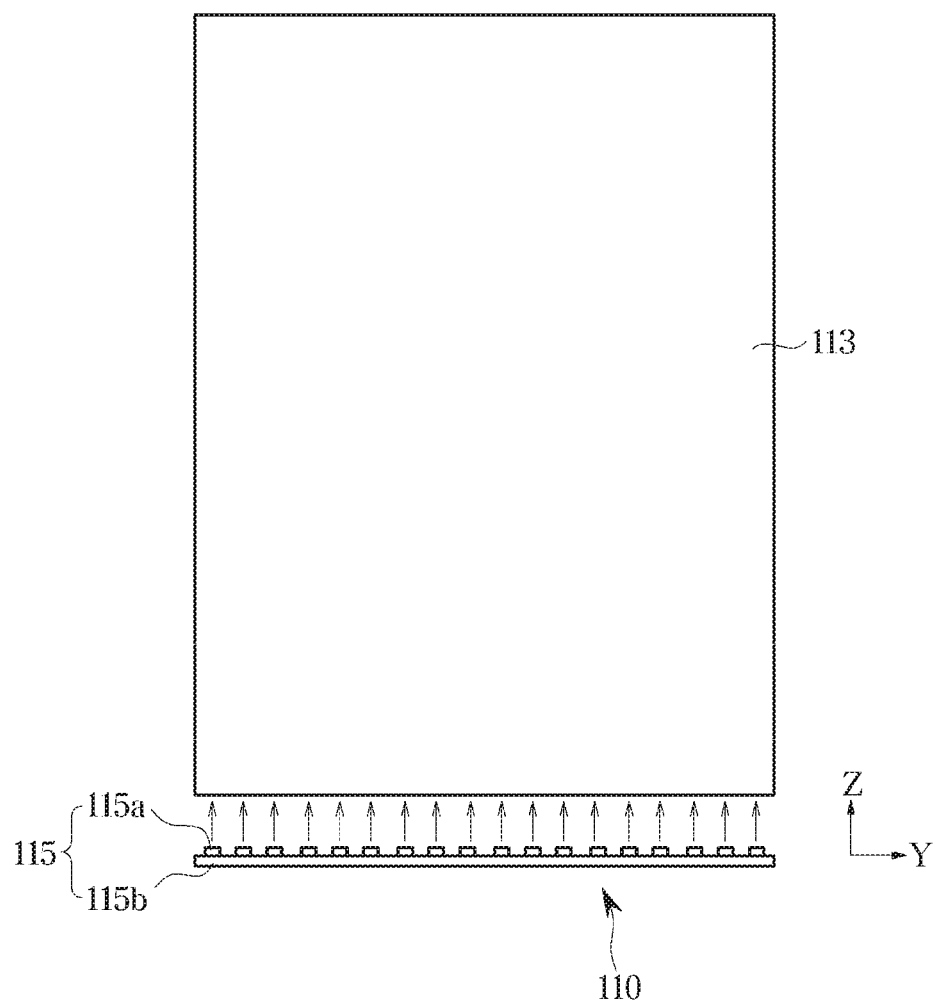
FIG. 3 is a view illustrating a structure of a backlight unit of a display apparatus according to an embodiment.
Figure 4:
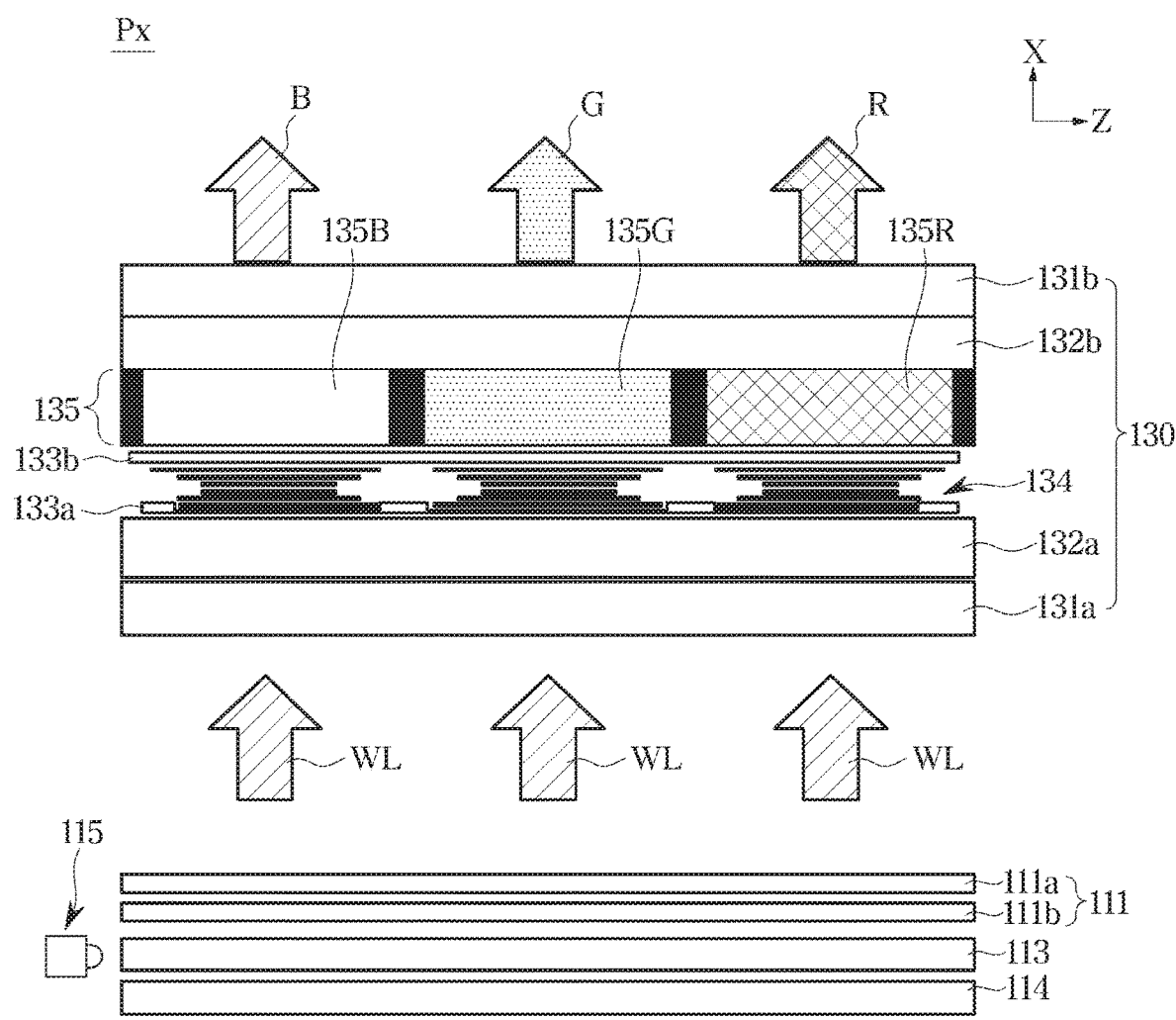
FIG. 4 is a side cross-sectional view illustrating a structure of a single pixel emitting light in a display apparatus according to an embodiment.

FIG. 3 is a view illustrating a structure of a backlight unit of a display apparatus according to an embodiment, and FIG. 4 is a side cross-sectional view illustrating a structure of a single pixel emitting light in a display apparatus according to an embodiment.

The backlight unit 110 may be installed at the rear of the liquid crystal panel 130, and may supply light necessary for displaying the image by the liquid crystal panel 130. The backlight unit 110 may be divided into an edge-type backlight unit in which the light source is disposed on the side of the liquid crystal panel 130 and a direct-type backlight unit in which the light source is arranged two-dimensionally under the liquid crystal panel 130.

In the display apparatus 100 according to the embodiment, the backlight unit 110 may be implemented as the edge-type backlight unit disposed on at least one side of the liquid crystal panel 130.

As illustrated in FIG. 3, the backlight unit 110 may include a light source 115a for generating light and a light guide plate 113 for converting a path of light generated from the light source 115a and outputting the surface light to the front of the display apparatus 100.

The light guide plate 113 may change a traveling direction of the light incident from the side and emit light toward the front surface of the light guide plate 113. The light guide plate 113 may employ transparent, high-intensity poly methyl methacrylate (PMMA) or polycarbonate (PC) materials. A plurality of convex stripes may be formed on the front surface of the light guide plate 113 to change the traveling direction of the light, and a plurality of dots may be formed on a rear surface of the light guide plate 113. In addition, the size and spacing of the convex stripes may be adjusted so that uniform light is emitted toward the front surface of the light guide plate 113, and the size and spacing of the dots may be adjusted.

Referring to FIG. 4, a reflective sheet 114 reflecting light emitted from the rear surface of the light guide plate 113 may be disposed at the rear of the light guide plate 113. An optical sheet 111 for refracting and scattering light emitted from the rear surface of the light guide plate 113 may be disposed in front of the light guide plate 113. For example, the optical sheet 111 may include a diffusion sheet 111b for diffusing light and a prism sheet 111a for refracting light.

The light emitted from the backlight unit 110 may be incident on the liquid crystal panel 130. For example, the backlight unit 110 may irradiate white light WL.

The white light WL may be incident on a rear polarizing plate 131a of the liquid crystal panel 130, and the rear polarizing plate 131a may polarize the white light WL to transmit only light that vibrates in the same direction as a polarization axis to a rear substrate 132a.

A rear electrode 133a may be installed on the front surface of the rear substrate 132a, and the rear electrode 133a may be a pixel electrode. The rear substrate 132a may be made of a transparent material such as PMMA or glass.

A front electrode 133b may be installed in front of the rear electrode 133a installed on the front surface of the rear substrate 132a. The front electrode 133b may be a common electrode.

A liquid crystal layer 134 may be filled between the rear substrate 132a on which the rear electrode 133a is installed and the front electrode 133b. According to a voltage applied to the rear electrode 133a ((hereinafter referred to as 'pixel electrode') and the front electrode 133b (hereinafter referred to as 'common electrode')), a current flows through the liquid crystal layer 134, and when the current flows through the liquid crystal layer 134, the arrangement of liquid crystal molecules constituting the liquid crystal layer 134 may be arranged.

The light passing through the liquid crystal layer 134 is incident on a color filter layer 135. The color filter layer 135 may include a red light filter 135R that outputs red light (R), a green light filter 135G that outputs green light (G), and a blue light filter 135B that outputs blue light (B). In this case, the color filter layer 135 may use a color filter composed of a dye or pigment that absorbs or transmits a wavelength in a specific region, and may use a quantum dot color filter that converts incident light into a specific color using quantum dots.

One pixel Px may include a red subpixel, a green subpixel, and a blue subpixel, and the pixels may be arranged in two dimensions to form one image. The red subpixel may include the red light filter 135R, the liquid crystal layer 134 that controls the transmittance of light incident on the red light filter 135R, the pixel electrode 133a that forms an electric field in the liquid crystal layer 134, and a TFT circuit or the like that applies a voltage to the corresponding pixel electrode 133a. The green subpixel may include the green light filter 135G, the liquid crystal layer 134 that controls the transmittance of light incident on the red light filter 135R, the pixel electrode 133a that forms an electric field in the liquid crystal layer 134, and the TFT circuit or the like that applies a voltage to the corresponding pixel electrode 133a. In addition, the blue subpixel may include the blue light filter 135B, the liquid crystal layer 134 that controls the transmittance of light incident on the red light filter 135R, the pixel electrode 133a that forms an electric field in the liquid crystal layer 134, and the TFT circuit or the like that applies a voltage to the corresponding pixel electrode 133a.

The light transmitted through the color filter layer 135 or color-converted in the color filter layer 135 may be incident on a front polarizing plate 131b through the front substrate 132b, and the light emitted through the front polarizing plate 131b emitted to the outside may be displayed as an image to a viewer.

Figure 5:
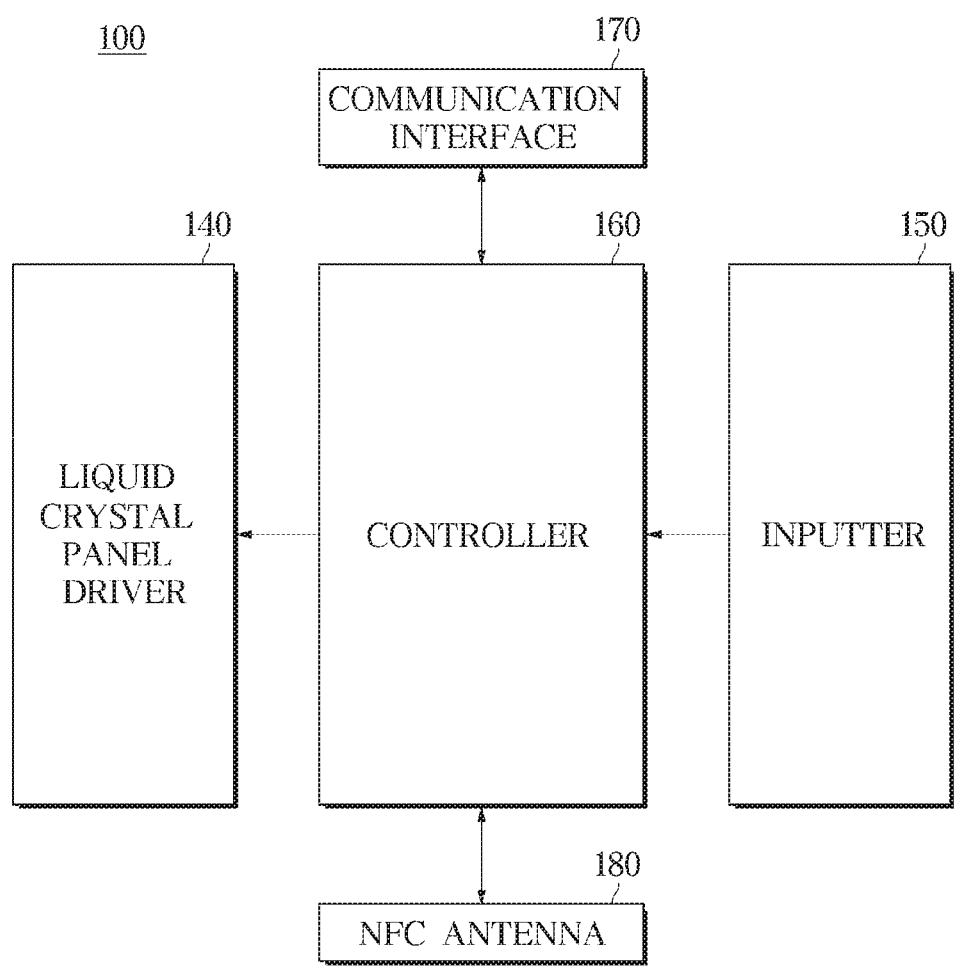
FIG. 5 is a control block diagram of a display apparatus according to an embodiment.
Figure 6:
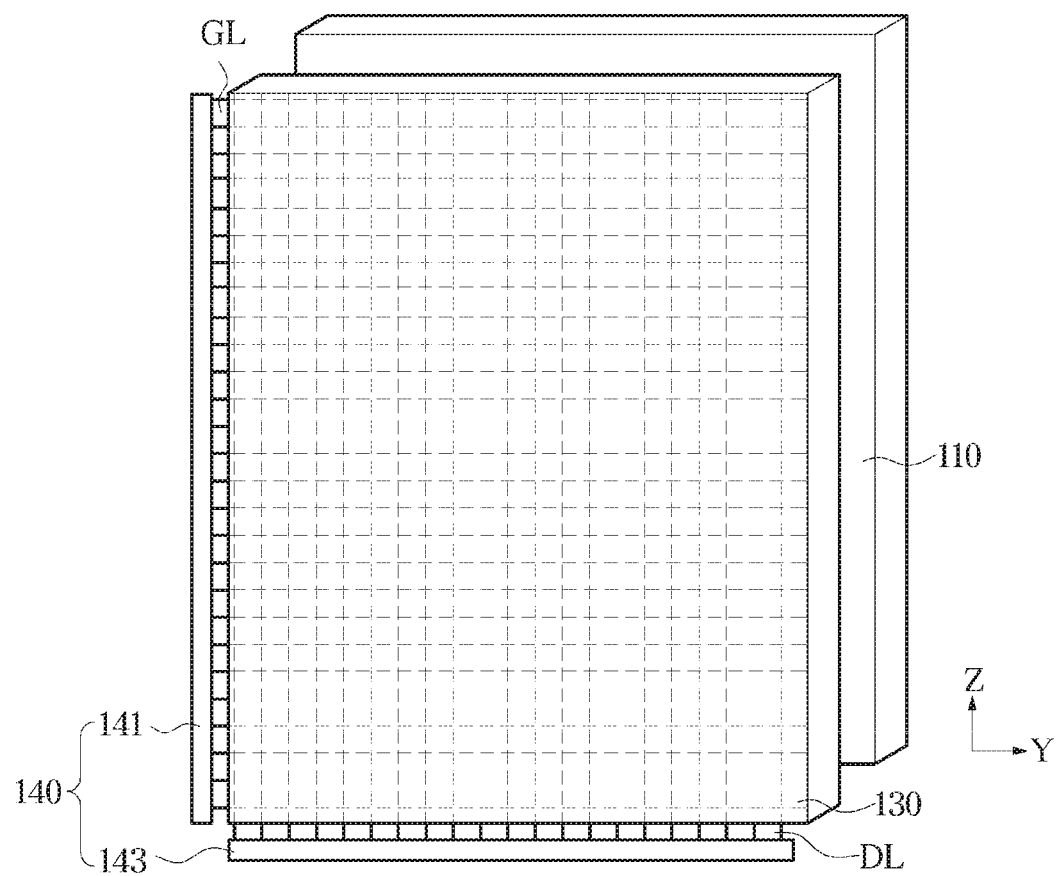
FIG. 6 is a view illustrating a configuration of a liquid crystal panel driver of a display apparatus according to an embodiment.
Figure 7:
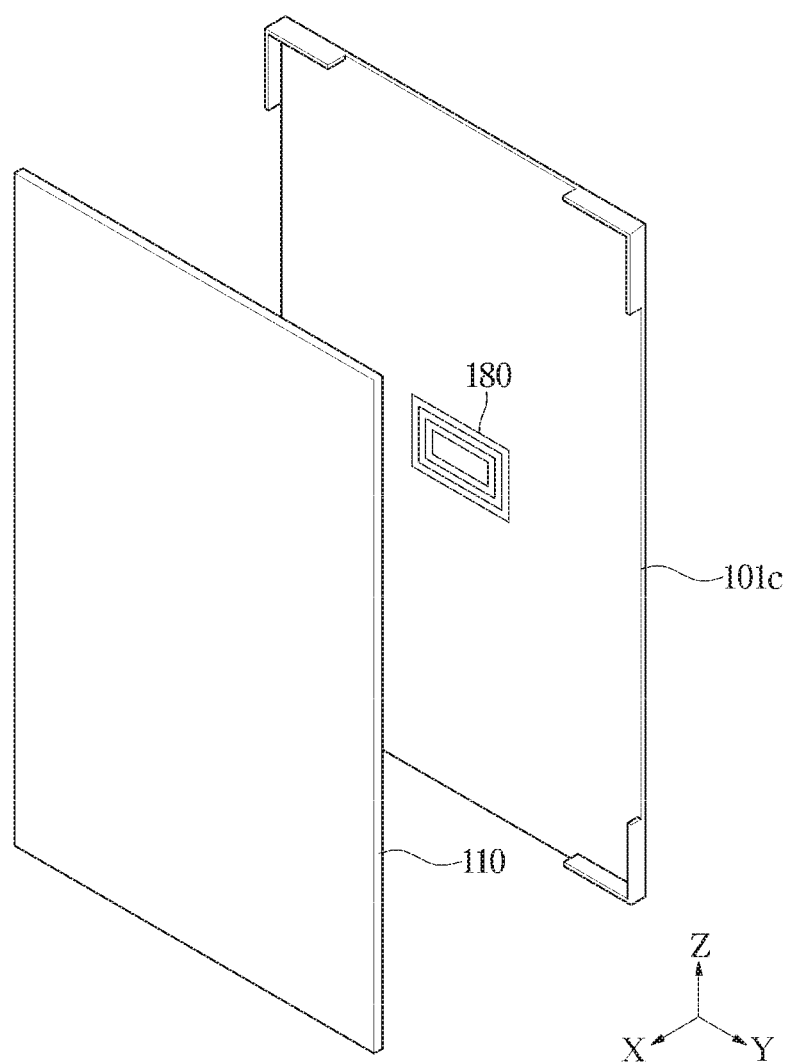
FIG. 7 is a view illustrating a Near Field Communication (NFC) antenna in a display apparatus according to an embodiment.

FIG. 5 is a control block diagram of a display apparatus according to an embodiment, FIG. 6 is a view illustrating a configuration of a liquid crystal panel driver of a display apparatus according to an embodiment, and FIG. 7 is a view illustrating a Near Field Communication (NFC) antenna in a display apparatus according to an embodiment.

Referring to FIG. 5, the display apparatus 100 may include a liquid crystal panel driver 140 that applies voltage to the liquid crystal panel 130, a Near Field Communication (NFC) antenna 180 disposed at the rear of the backlight unit 110, and the inputter 150 that receives a selection of an NFC mode, and a controller 160 that controls the liquid crystal panel driver 140 such that at least one pixel in a region corresponding to a position of the NFC antenna 180 among the plurality of pixels displays a white object when the NFC mode is selected.

In addition, as described above, the display apparatus 100 may include the liquid crystal panel driver 140 that is configured to drive the liquid crystal panel 130 including the plurality of pixels and the backlight unit 110 disposed at the rear of the liquid crystal panel 130.

Also, a communication interface 170 that performs wireless communication with an external electronic device may be further included in the display apparatus 100. The communication interface 170 may include at least one communication module that transmits and receives data according to a predetermined communication protocol. For example, the wireless communication module may include at least one of various wireless communication modules that can be connected to an Internet network through wireless communication methods such as Wi-Fi, Wireless Broadband, Global System for Mobile Communication (GSM), Code Division Multiple Access (CDMA), Wideband Code Division Multiple Access (WCDMA), Universal Mobile Telecommunications System (UMTS), Time Division Multiple Access (TDMA), Long Term Evolution (LTE), 4th generation (4G) mobile communication, and 5th generation (5G) mobile communication.

The communication interface 170 may perform an operation such as communicating with a central server that controls the display apparatus 100, fetching information required by the user from an external server, or transmitting information input by the user to the external server.

The liquid crystal panel driver 140 will be described with reference to FIG. 6. The liquid crystal panel driver 140 may include a gate driver 141 that provides a gate signal generated based on image data transmitted from the controller 160 to a gate line GL arranged in a row direction, and a data driver 143 that provides a data signal generated based on the image signal transmitted from the controller 160 to a data line DL arranged in a column direction. For example, the gate driver 141 and the data driver 143 may be implemented as a display driver integrated circuit (DDI).

The gate line GL may be connected to a gate electrode of a switching element TFT, the data line DL may be connected to a source electrode of the TFT, and a drain electrode of the TFT may be connected to the pixel electrode 133a. All connections are electrical connections. The TFT may be turned on when the gate signal is applied from the gate line GL to transmit the data signal supplied from the data line DL to the pixel electrode 133a.

The gate driver 141 may transmit an on or off signal based on the image data to the gate electrode of the TFT along the gate line GL to turn on or off the TFT.

The data driver 143 may select a gradation voltage for each of the data lines DL based on the image data, and transmit the selected gradation voltage to the pixel electrode 133a through the data line DL.

A predetermined voltage such as a reference voltage or a ground voltage may be applied to the common electrode 133b, and accordingly, an electric field may be formed between the common electrode 133b and the pixel electrode 133a. An arrangement angle of the liquid crystal molecules of the liquid crystal layer 134 may be changed by the electric field, and light transmittance may be changed according to the changed arrangement angle to display the image according to the image data.

When each of the subpixels is controlled in this manner, a color to be displayed in a single pixel may be implemented by a combination of light emitted from the subpixels, and the image corresponding to the image data may be displayed by the combination of the pixels.

The display apparatus 100 may exchange data with the external electronic device through NFC communication. NFC communication may be a communication method that supports the transmission and reception of data between devices within a distance of about 10 cm or less, and may securely transmit and receive data by applying encryption technology. Since it does not require a complicated pairing procedure between two terminals, mutual recognition is possible within about 0.1 seconds. Accordingly, the display apparatus 100 may support NFC communication to conveniently exchange data with the user's electronic device.

Referring to FIG. 7, the NFC antenna 180 used for NFC communication may be disposed behind the backlight unit 110. Particularly, the NFC antenna 180 may be mounted on a rear structure disposed behind the backlight unit 110, and for example, the rear structure may be the bottom chassis 101*c*. However, the NFC antenna 180 mounted on the bottom chassis 101*c* is only an example of the display apparatus 100. In addition, the NFC antenna 180 mounted on the bottom chassis 101*c* is determined in consideration of the transmission and reception sensitivity of the NFC antenna 180, and of course, it is also possible to be mounted on other rear structures in addition to the bottom chassis 101*c*.

Since the NFC antenna 180 is built into the display apparatus 100, the inconvenience of having a separate NFC module may be eliminated. Since the NFC antenna 180 is located behind the backlight unit 110, it does not affect the path of light emitted from the backlight unit 110.

As described above, the display apparatus 100 according to the embodiment may be implemented as the edge-type display apparatus in which the light source 115*a* is disposed on the side surface of the light guide plate 113. When the display apparatus 100 is implemented as the edge-type display apparatus, a depth of the backlight unit 110 is shorter than that of a direct-type display apparatus, which is advantageous in terms of transmission and reception sensitivity of NFC communication.

Figure 8:
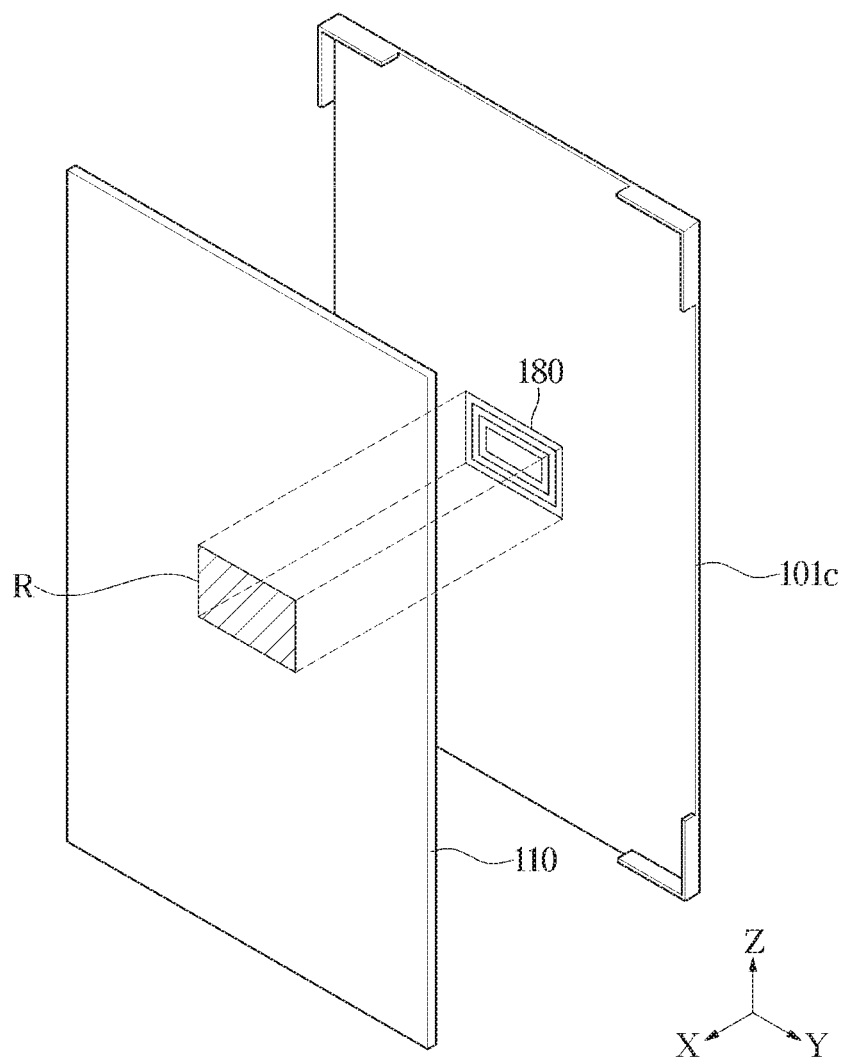
FIG. 8 is a view illustrating a position corresponding to an NFC antenna in a display apparatus according to an embodiment.
Figure 9:
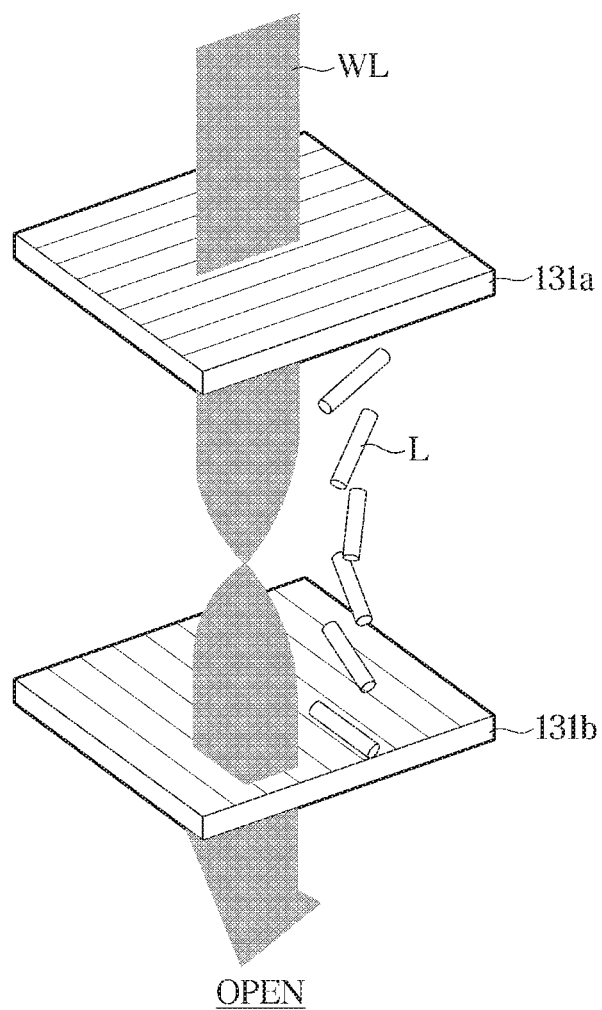
FIG. 9 is a view illustrating a case in which a pixel is opened by an arrangement of liquid crystal molecules in a display apparatus according to an embodiment.
Figure 10:
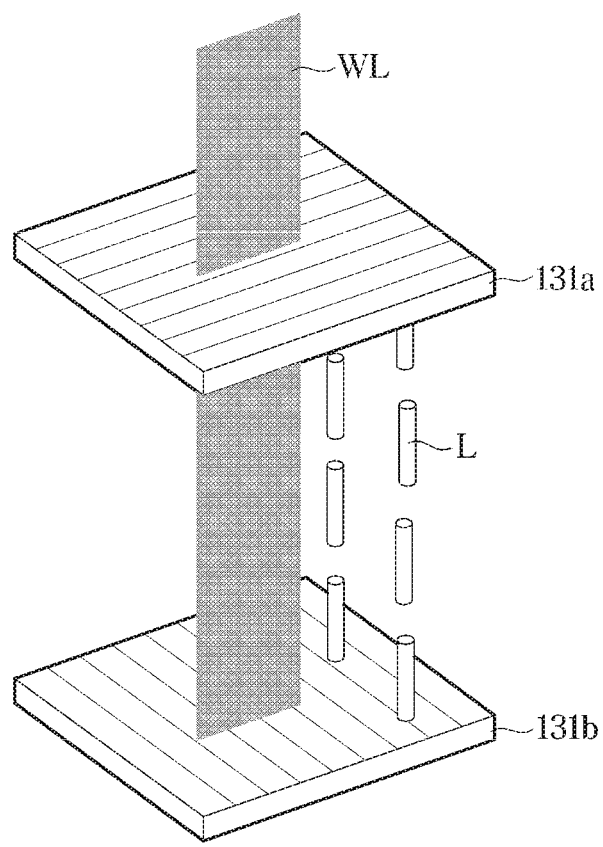
FIG. 10 is a view illustrating a case in which a pixel is closed by an arrangement of liquid crystal molecules in a display apparatus according to an embodiment.

FIG. 8 is a view illustrating a position corresponding to an NFC antenna in a display apparatus according to an embodiment, FIG. 9 is a view illustrating a case in which a pixel is opened by an arrangement of liquid crystal molecules in a display apparatus according to an embodiment, and FIG. 10 is a view illustrating a case in which a pixel is closed by an arrangement of liquid crystal molecules in a display apparatus according to an embodiment.

The user may input the selection for the NFC mode through the inputter 150 to use an NFC communication function of the display apparatus 100. When the NFC mode is selected, the controller 160 may control the liquid crystal panel driver 140 such that at least one pixel in the region corresponding to the position of the NFC antenna 180 displays the white object.

Referring to FIG. 8, a region R corresponding to the position of the NFC antenna 180 is a region facing the NFC antenna 180 in the backlight unit 110 and may be a region having a size and shape corresponding to the size and shape of the NFC antenna 180. The size of the region corresponding to the size of the NFC antenna 180 may be the same or similar to the size of the NFC antenna 180. For example, the region may be a size that can cover the size of the NFC antenna 180. The shape of the region corresponding to the shape of the NFC antenna 180 may be the same or similar to the shape of the NFC antenna 180. For example, it may be a shape that covers the shape of the NFC antenna 180.

The controller 160 may open the pixels included in the corresponding region R to display the white object. Hereinafter, the display apparatus 100 will be described in detail with reference to FIGS. 9 and 10.

Referring to FIGS. 9 and 10 and as described above with respect to FIG. 4, the liquid crystal layer 134 may be filled between the rear polarizing plate 131*a* and the front polarizing plate 131*b*, and the liquid crystal layer 134 may include a plurality of liquid crystal molecules L. The rear polarizing plate 131*a* and the front polarizing plate 131*b* may have polarization directions perpendicular to each other.

For example, as illustrated in FIG. 9, the liquid crystal molecules L may be arranged in an increasingly distorted state from the rear to the front, and the arrangement state of the foremost and the rearmost liquid crystal molecules may be 90 degrees from each other. When no voltage is applied, light passing through the rear polarizing plate 131*a* may be twisted according to an alignment angle of the liquid crystal molecules L to pass through the front polarizing plate 131*b*. The state may be referred to as an open state of the pixel.

As illustrated in FIG. 10, when the data voltage is applied through the data line DL to flow electricity to the liquid crystal layer 134, as the arrangement state of the liquid crystal molecules L constituting each layer is the same, the light passes through the rear polarizing plate 131*a* and the liquid crystal as it is, but does not pass through the front polarizing plate 131*b*. Here, the state may be referred to as a closed state of the pixel.

As illustrated in FIG. 9, the influence of the liquid crystal on an RF signal is reduced when the pixel is open, so that better transmission and reception sensitivity may be obtained than when the pixel is closed as illustrated in FIG. 10. Accordingly, the controller 160 may control the liquid crystal panel driver 140 to open at least one pixel of the region R corresponding to the position of the NFC antenna 180 in response to the NFC mode being selected. The liquid crystal panel driver 140 may be turned off without applying the voltage to at least one pixel of the region R corresponding to the position of the NFC antenna 180 according to a control signal transmitted from the controller 160.

Specifically, not applying the voltage to the pixel may mean that no voltage is applied to a plurality of subpixels constituting the single pixel Px. When no voltage is applied to the plurality of subpixels constituting the single pixel Px, light passing through the rear polarizing plate 131*a* in each of the subpixels passes through the front polarizing plate 131*b*, and white light is emitted from the single pixel Px constituted by the plurality of subpixels.

Accordingly, at least one pixel of the region R corresponding to the position of the NFC antenna 180 may display the white object. The white object may be a white window having the shape of the region R corresponding to the position of the NFC antenna 180.

Alternatively, it is also possible to partially open at least one pixel of the region R corresponding to the position of the NFC antenna 180. Accordingly, in response to the NFC mode being selected, the controller 160 may control the liquid crystal panel driver 140 to apply a voltage less than or equal to a reference voltage value to at least one pixel of the region R corresponding to the position of the NFC antenna 180. The reference value may be determined based on the transmission and reception sensitivity of the NFC antenna 180, and may also be determined in a range capable of outputting white light.

When the voltage less than or equal to the reference voltage value, that is, the voltage less than Vth (reference value or threshold value) is applied to at least one pixel of the region R corresponding to the position of the NFC antenna 180, the corresponding pixel may pass an amount of light greater than or equal to the reference value of light supplied from the backlight unit 110. The former reference value may be a reference value for voltage, and the latter reference value may be a reference value for the amount of light, and while the two reference values may be related to each other, they represent different values.

When the voltage less than the reference value is applied to at least one pixel, it is also possible to apply different amounts of voltage to each of the plurality of subpixels. Accordingly, since at least one pixel of the region R corresponding to the position of the NFC antenna 180 can display a specific pattern, and thus the white object may include a white pattern.

Figure 11:
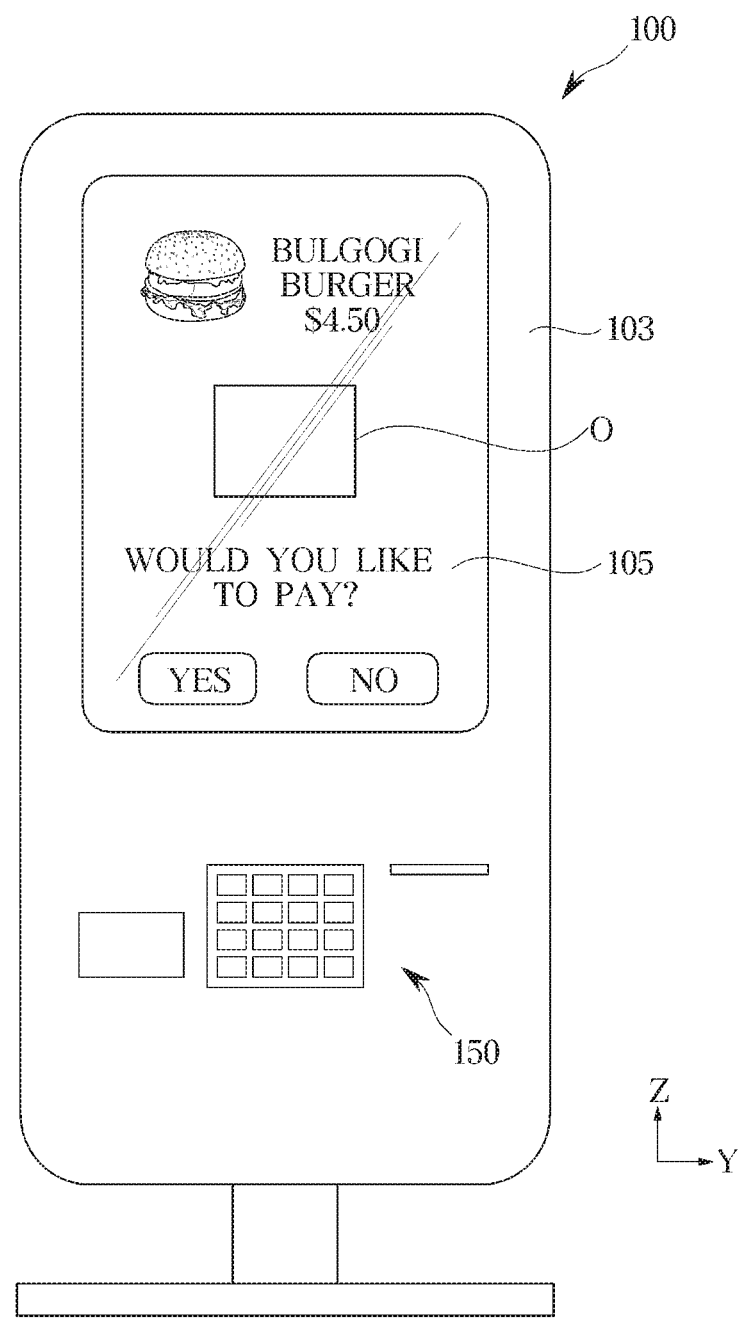
FIG. 11 is a view illustrating an example of an image displayed on a display apparatus according to an embodiment.
Figure 12:
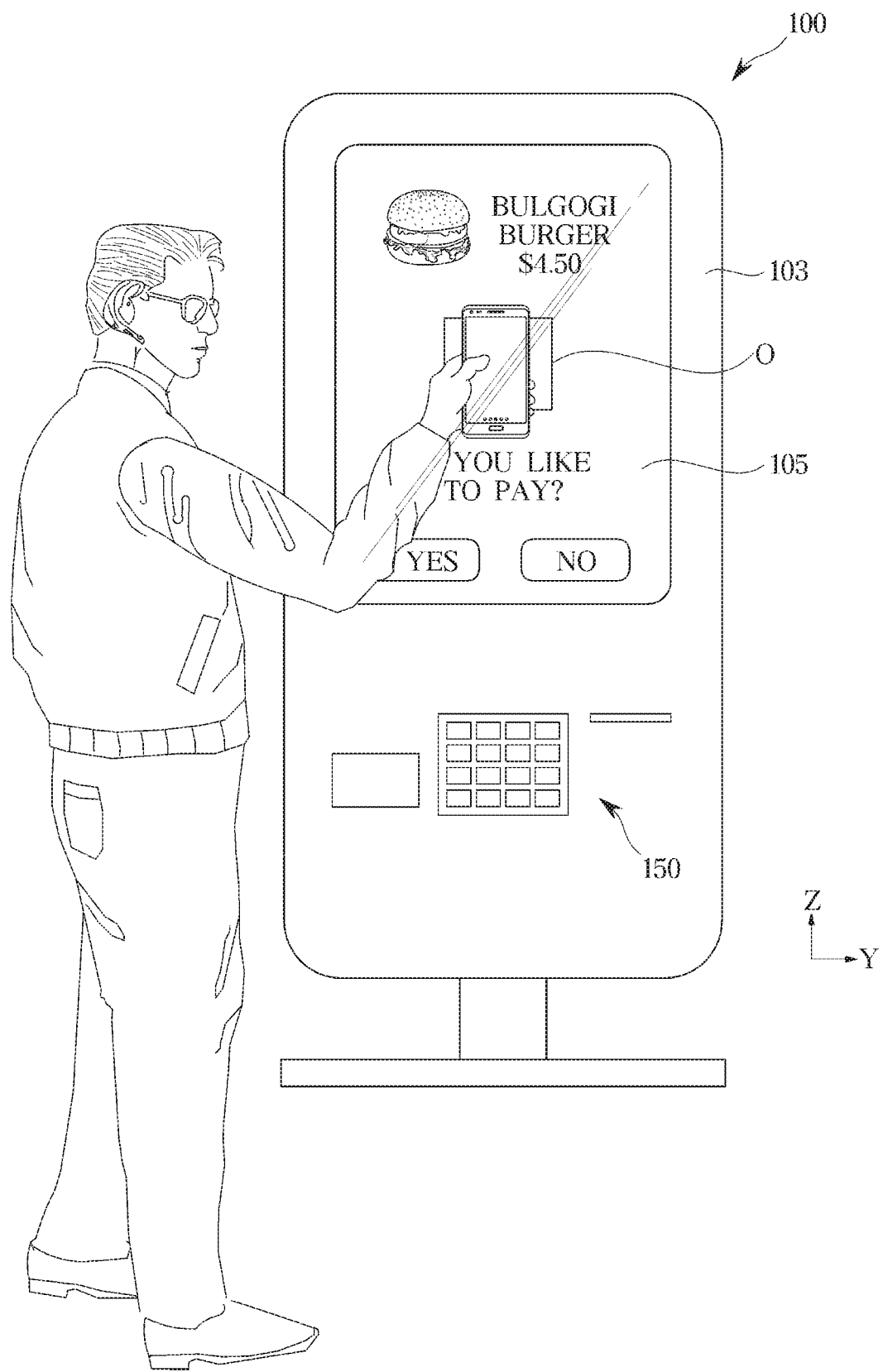
FIG. 12 is a view illustrating a device tagged to a display apparatus according to an embodiment.
Figure 13:
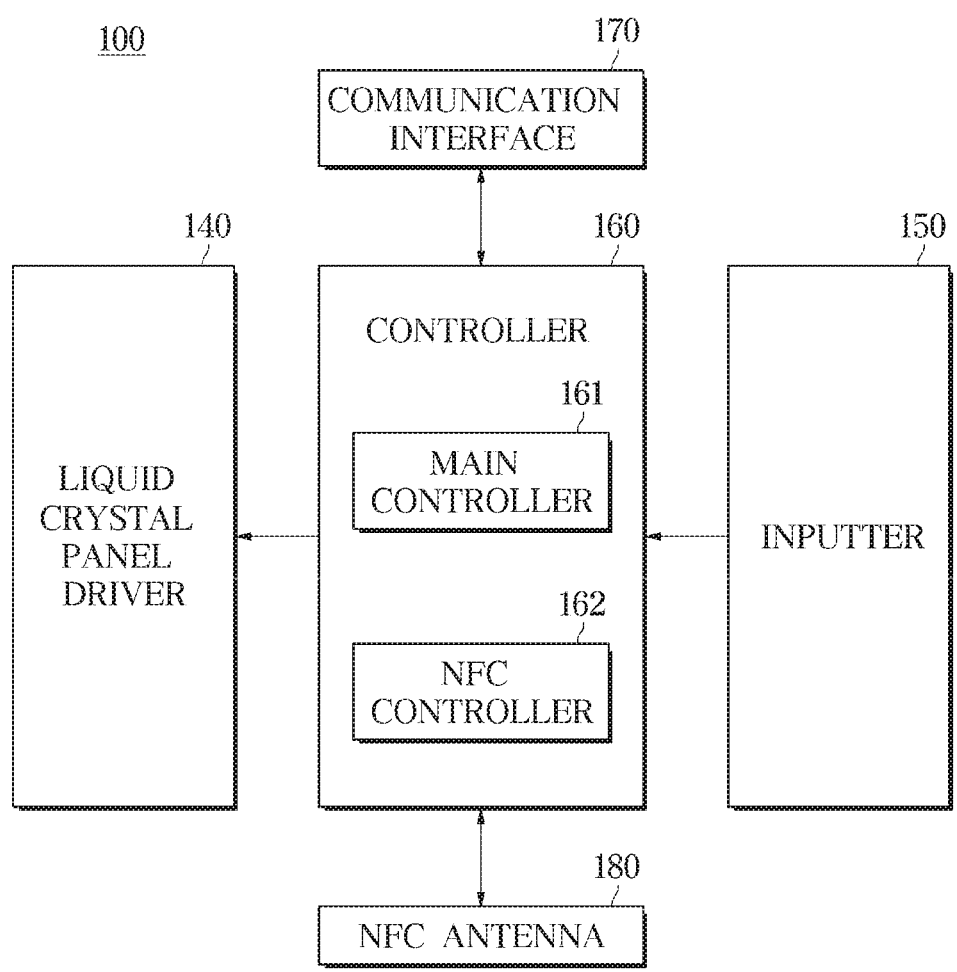
FIG. 13 is a control block diagram of a display apparatus according to an embodiment.

FIG. 11 is a view illustrating an example of an image displayed on a display apparatus according to an embodiment, FIG. 12 is a view illustrating a device tagged to a display apparatus according to an embodiment, and FIG. 13 is a control block diagram of a display apparatus according to an embodiment.

For example, the display apparatus 100 may be used for menu ordering and payment in a restaurant. When the user inputs the selection of the NFC mode through the inputter 150 of the display apparatus 100, at least one pixel of the region R corresponding to the position of the NFC antenna 180 according to the above-described embodiment may display the white object, and a white object O may be displayed on the screen 105 of the display apparatus 100. At this time, other pixels of the liquid crystal panel 130 may display the image displayed before the selection of the NFC mode, and the white object may be displayed only in the region corresponding to the position of the NFC antenna 180.

The selection of the NFC mode may be made through a separate step of selecting the NFC mode, or it is possible that the NFC mode is automatically selected when payment is selected.

As illustrated in FIG. 12, the user may grasp a tag position of the electronic device by the white object O displayed on the screen 105. To more clearly indicate the tag position, as described above, it is also possible to display a specific pattern capable of indicating the tag position by partially opening at least one pixel of the region corresponding to the position of the NFC antenna 180.

In response to the electronic device being tagged with the white object O, the NFC antenna 180 may receive data transmitted from the electronic device. The controller 160 may process the received data and perform an operation according to the processed data. Here, the controller may include at least one processor.

For example, as illustrated in FIG. 13, the controller 160 may include a main controller 161 that controls an overall operation of the display apparatus 100 and an NFC controller 162 that performs operations related to NFC communication. The operation of the controller 160 related to the above-described image display and white object display may be performed by the main controller 161, and the operation of transmitting and receiving data through the NFC antenna 180 may be performed by the NFC controller 162.

The controller 160 may be implemented with a printed circuit board and various circuits mounted on the printed circuit board. For example, a memory, a microprocessor, and a control circuit board on which they are mounted may be included, and when the main controller 161 and the NFC controller 162 are separately provided, separate microprocessors may be provided.

The display apparatus 100 according to the embodiment may perform various functions through NFC communication in addition to the payment functions illustrated in FIGS. 11 and 12. For example, when the display apparatus 100 is installed in a tourist destination, the user may tag his or her mobile device to the display apparatus 100 to receive information about a current position from the display apparatus 100. When the display apparatus 100 is installed in a school or a company, the user may tag his or her mobile device to the display apparatus 100 to record the time of attending or going to school, recording the amount of exercise, or providing scheduling information.

Hereinafter, a method of controlling the display apparatus according to an embodiment will be described. In the method of controlling the display apparatus, the display apparatus 100 according to the embodiments described above may be used. That is, the method of controlling the display apparatus according to the embodiments relates to the method of controlling the display apparatus 100 described above. Therefore, the contents described with reference to FIGS. 1 to 13 may be applied to the method of controlling the display apparatus according to the embodiments.

Figure 14:
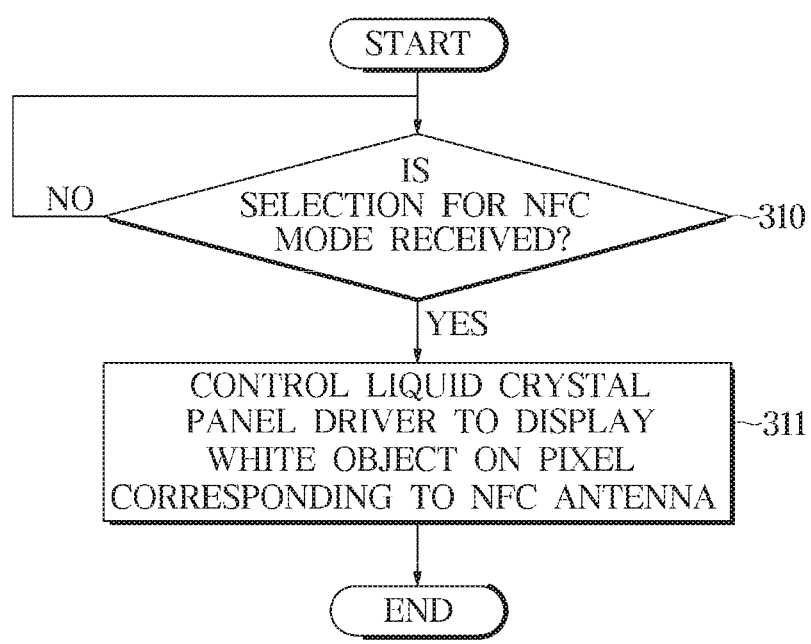
FIG. 14 is a flowchart illustrating a method of controlling a display apparatus according to an embodiment.

FIG. 14 is a flowchart illustrating a method of controlling a display apparatus according to an embodiment.

Referring to FIG. 14, the method of controlling a display apparatus includes receiving a user input for selecting the NFC mode (S310). In response to the selection for the NFC mode being input (YES in S310), the controller 160 may control the liquid crystal panel driver to display the white object on the pixel corresponding to the NFC antenna (S311). The NFC antenna-corresponding pixel may refer to at least one pixel in the region R corresponding to the above-described position of the NFC antenna 180.

Here, the display apparatus 100 may include the liquid crystal panel 130 including the plurality of pixels, the backlight unit 110 disposed on the rear of the liquid crystal panel 130 to supply light to the liquid crystal panel 130, and the liquid crystal panel driver 140 for applying voltage to the liquid crystal panel driver 140.

As described above, the backlight unit 110 may include the light guide plate 113 disposed behind the liquid crystal panel 130 and at least one of the light sources 115a disposed on at least one side of the light guide plate 113.

In addition, the NFC antenna 180 may be mounted on the rear structure disposed behind the backlight unit 110, and for example, the rear structure may be the bottom chassis 101c.

In order to display the white object on the NFC antenna-corresponding pixel in S311, the liquid crystal panel driver 140 may open the corresponding pixel by not applying voltage to at least one pixel of the region R corresponding to the position of the NFC antenna 180 according to the control signal transmitted from the controller 160.

In the embodiment, not applying voltage to the pixel may mean that no voltage is applied to the plurality of subpixels constituting the single pixel Px. When no voltage is applied to the plurality of subpixels constituting the single pixel Px, light passing through the rear polarizing plate 131a in each of the subpixels passes through the front polarizing plate 131b, and white light is emitted from the single pixel Px constituted by the plurality of subpixels.

Accordingly, at least one pixel of the region R corresponding to the position of the NFC antenna 180 may display the white object. The white object may be a white window having the shape of the region R corresponding to the position of the NFC antenna 180.

Alternatively, it is also possible to partially open at least one pixel of the region R corresponding to the position of the NFC antenna 180. Accordingly, in response to the NFC mode being selected, the controller 160 may control the liquid crystal panel driver 140 to apply the voltage less than the reference value to at least one pixel of the region R corresponding to the position of the NFC antenna 180. The reference value may be determined in consideration of the transmission and reception sensitivity of the NFC antenna 180, and may also be determined in the range capable of outputting white light.

When the voltage less than the reference value is applied to at least one pixel of the region R corresponding to the position of the NFC antenna 180, the corresponding pixel may pass the amount of light greater than or equal to the reference value of light supplied from the backlight unit 110. The former reference value may be the reference value for voltage, and the latter reference value may be the reference value for the amount of light, and the two reference values may be related to each other but are different values.

When the voltage less than the reference value is applied to at least one pixel, it is also possible to apply different amounts of voltage to each of the plurality of subpixels. Accordingly, since at least one pixel of the region R corresponding to the position of the NFC antenna 180 can display the specific pattern, the white object may include the white pattern.

In response to a device performing the NFC function being tagged on the white object, the NFC antenna 180 may receive the signal transmitted from the device.

According to the display apparatus and the method of controlling the display apparatus according to the above-described embodiment, it is not necessary to provide a separate NFC module to use the NFC function by embedding the NFC antenna in the display apparatus.

In addition, it is possible to improve the transmission and reception sensitivity of the NFC antenna by opening pixels in the region corresponding to the position of the NFC antenna, and the white object is displayed on the screen while opening the pixels, so that the user may accurately recognize the tag position.

According to an aspect of an embodiment, there is provided the display apparatus capable of enabling NFC communication between the display apparatus and the external electronic device by embedding the NFC antenna inside the display apparatus, and the method of controlling the same.

According to another aspect of an embodiment, there is provided the display apparatus capable of improving the sensitivity of NFC communication between the NFC antenna and the external electronic device by opening the pixel corresponding to the position of the NFC antenna when operating in the NFC mode, and the method of controlling the same.

According to another aspect of an embodiment, there is provided a display apparatus capable of enabling the user to grasp the tag position by displaying the white object on the pixel corresponding to the position of the NFC antenna when operating in the NFC mode, and the method of controlling the same.

Embodiments of the disclosure have been described with reference to the accompanying drawings. It should be obvious to a person of ordinary skill in the art that the disclosure may be practiced in other forms by modifying and substituting some or all of the components of the embodiments described above without changing the technical idea or essential features of the disclosure. The above embodiments are only by way of example, and should not be interpreted as a limitation to the embodiments.

What is claimed is:

1. A display apparatus comprising:
a liquid crystal panel comprising a plurality of pixels;
a backlight unit disposed behind the liquid crystal panel and configured to supply light to the liquid crystal panel;
a liquid crystal panel driver configured to apply a voltage to the liquid crystal panel;
a Near Field Communication (NFC) antenna disposed behind the backlight unit; and
a controller configured to, based on an NFC mode being selected, control the liquid crystal panel driver such that at least one pixel in a region corresponding to a position of the NFC antenna among the plurality of pixels is in an open state and displays a white object,
wherein light passing through a rear polarizing plate passes through a front polarizing plate in the open state.

2. The display apparatus according to claim 1, wherein the backlight unit comprises a light guide plate and at least one light source disposed on at least one side of the light guide plate.

3. The display apparatus according to claim 1, wherein, based on the NFC mode being selected, the controller is further configured to control the liquid crystal panel driver so as to not apply the voltage to the at least one pixel in the region corresponding to the position of the NFC antenna among the plurality of pixels.

4. The display apparatus according to claim 1, wherein, based on the NFC mode being selected, the controller is further configured to control the liquid crystal panel driver so as to not apply the voltage to a plurality of subpixels included in the at least one pixel of the region corresponding to the position of the NFC antenna among the plurality of pixels.

5. The display apparatus according to claim 1, wherein, based on the NFC mode being selected, the controller is further configured to control the liquid crystal panel driver to apply the voltage that is less than or equal to a reference voltage value to the at least one pixel in the region corresponding to the position of the NFC antenna among the plurality of pixels.

6. The display apparatus according to claim 1, wherein, based on the NFC mode being selected, the controller is further configured to control the liquid crystal panel driver so that the at least one pixel of the region corresponding to the position of the NFC antenna, among the plurality of pixels, passes an amount of light, supplied from the backlight unit, that is greater than or equal to a reference light value.

7. The display apparatus according to claim 1, further comprising:
a rear structure disposed rear to the backlight unit and mounted with the NFC antenna.

8. The display apparatus according to claim 7, wherein the rear structure comprises a bottom chassis.

9. The display apparatus according to claim 1, further comprising:
an inputter configured to receive an input selecting the NFC mode.

10. The display apparatus according to claim 1, wherein, based on an external device performing an NFC function being tagged on the white object displayed on the at least one pixel, the NFC antenna is configured to receive a signal transmitted from the external device.

11. A method of controlling a display apparatus, the display apparatus including a liquid crystal panel comprising a plurality of pixels, a backlight unit disposed behind the liquid crystal panel and configured to supply light to the liquid crystal panel, and a liquid crystal panel driver configured to apply a voltage to the liquid crystal panel, the method comprising:
receiving, by an inputter, an input for selecting a Near Field Communication (NFC) mode; and
based on receiving the input for selecting the NFC mode, controlling, by a controller, the liquid crystal panel driver such that at least one pixel in a region corresponding to a position of an NFC antenna among the plurality of pixels is in an open state and displays a white object,
wherein light passing through a rear polarizing plate passes through a front polarizing plate in the open state.

12. The method according to claim 11, wherein the backlight unit comprises a light guide plate and at least one light source disposed on at least one side of the light guide plate.

13. The method according to claim 11, wherein the controlling of the liquid crystal panel driver further comprises:
based on the NFC mode being selected, controlling the liquid crystal panel driver so as to not apply the voltage to the at least one pixel in the region corresponding to the position of the NFC antenna among the plurality of pixels.

14. The method according to claim 11, wherein the controlling of the liquid crystal panel driver further comprises:
based on the NFC mode being selected, controlling the liquid crystal panel driver so as to not apply the voltage to a plurality of subpixels included in the at least one pixel of the region corresponding to the position of the NFC antenna among the plurality of pixels.

15. The method according to claim 11, wherein the controlling of the liquid crystal panel driver further comprises:
based on the NFC mode being selected, controlling the liquid crystal panel driver to apply the voltage that is less than or equal to a reference voltage value to the at least one pixel in the region corresponding to the position of the NFC antenna among the plurality of pixels.

16. The method according to claim 11, wherein the controlling of the liquid crystal panel driver further comprises:
based on the NFC mode being selected, controlling the liquid crystal panel driver so that the at least one pixel of the region corresponding to the position of the NFC antenna among the plurality of pixels passes an amount of light, supplied from the backlight unit, that is greater than or equal to a reference light value.

17. The method according to claim 11, wherein the display apparatus further comprises a rear structure disposed rear to the backlight unit and mounted with the NFC antenna.

18. The method according to claim 11, further comprising:
based on an external device performing an NFC function being tagged on the white object displayed on the at least one pixel, receiving, by the NFC antenna, a signal transmitted from the external device.

* * * * *